W. R. SMITH.
MACHINE FOR CLEANING CRUDE RUBBER.
APPLICATION FILED NOV. 21, 1912.
1,089,162.
Patented Mar. 3, 1914.
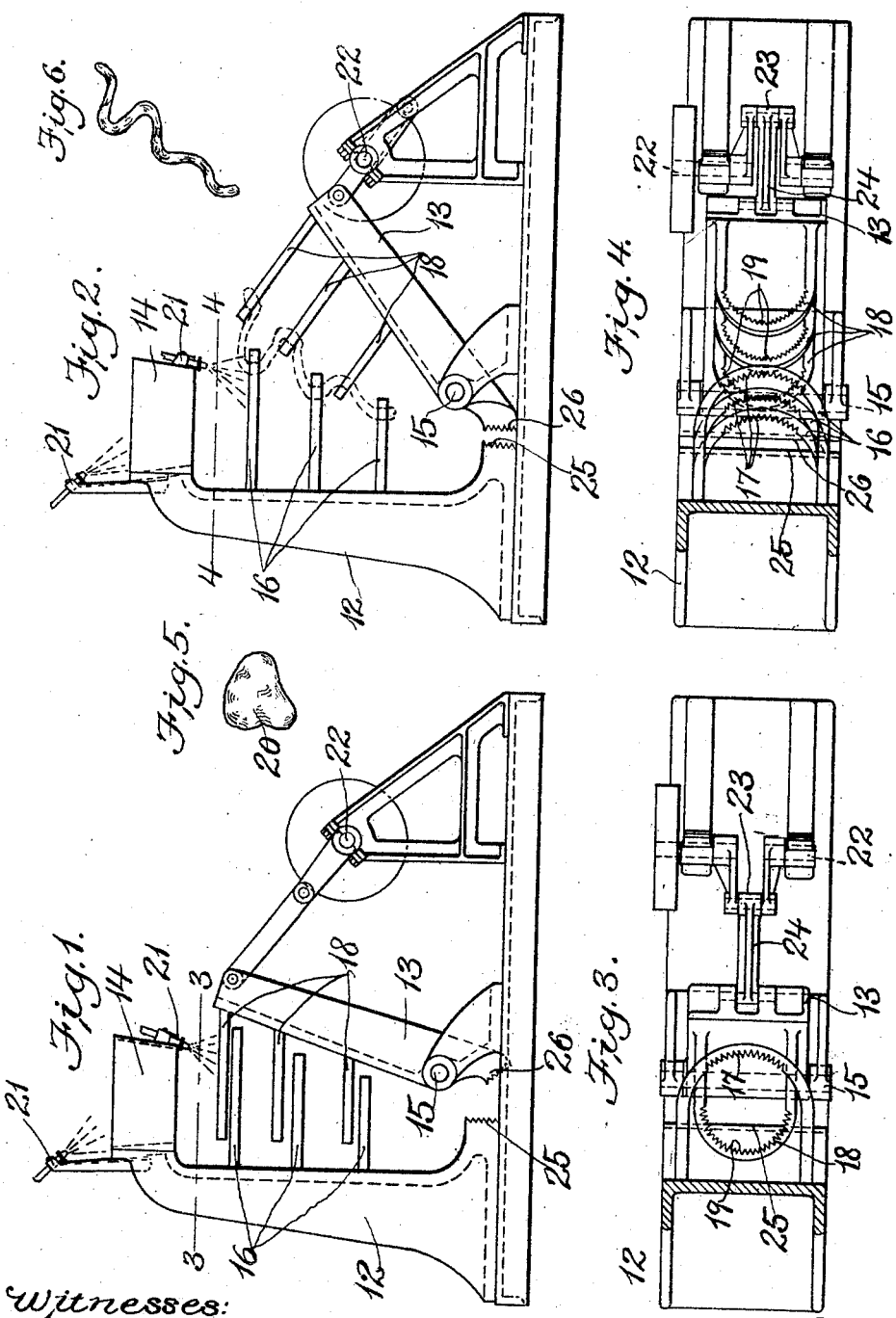
Witnesses:
P. W. Pezzetti
G. L. Johnson
Inventor:
W. R. Smith
by Knight Brown Quinby May
Attys.

UNITED STATES PATENT OFFICE.

WILLIAM R. SMITH, OF BUFFALO, NEW YORK.

MACHINE FOR CLEANING CRUDE RUBBER.

1,089,162.

Specification of Letters Patent. Patented Mar. 3, 1914.

Application filed November 21, 1912. Serial No. 732,685.

*To all whom it may concern:*

Be it known that I, WILLIAM R. SMITH, a citizen of the United States, and resident of Buffalo, in the county of Erie and State of New York, have invented certain new and useful Improvements in Machines for Cleaning Crude Rubber, of which the following is a specification.

This invention has for its object to enable sand and other foreign matter accompanying crude rubber to be expeditiously and economically separated therefrom before the rubber is subjected to the usual treatment by crushing rolls.

Heretofore crude rubber containing sand, dirt, etc., has been passed between crushing rolls without preliminary treatment to remove the foreign matter, which is to a considerable extent more firmly embedded in the rubber by the action of the rolls.

My invention consists in the improved means for removing this foreign matter, hereinafter described and claimed.

Of the accompanying drawings: Figures 1 and 2 represent a side view of a machine embodying my invention, the jaws hereinafter mentioned being shown in different relative positions; Fig. 3 represents a section on line 3—3 of Fig. 1; Fig. 4 represents a section on line 4—4 of Fig. 2; Fig. 5 represents a piece of crude rubber before treatment, and Fig. 6 represents the same piece as stretched by the machine.

The same reference characters represent the same or similar parts in all the figures.

In the drawings, 12 and 13 represent two opposed supports, which are relatively movable to vary the distance between them, said supports forming opposite sides of a vertical passage through which crude rubber, inserted in a hopper or guide 14, is adapted to descend by gravitation. The support 12 is preferably fixed, the support 13 being pivoted at 15 and adapted to swing toward and from the support 12.

To the support 12 are attached a series of jaws 16, each composed of a stout, practically U-shaped metal rod or bar, the ends of which are rigidly attached to the support, the intermediate portion, constituting the acting portion of the jaw, being spaced from the support 12 so that the rubber may pass between the jaw and support. Each jaw may be provided with teeth 17 at its inner side.

To the support 13 are attached a series of jaws 18 formed and attached like the jaws 16, and alternating with the latter, the acting portions of the jaws 18 being spaced from the support 13 and preferably provided with teeth 19.

When the supports are at their minimum distance apart, as shown by Fig. 1, the jaws 16 and 18 are at opposite sides of the path in which the rubber moves downwardly between the supports. When the distance between the supports is increased, as shown by Fig. 2, the jaws 16 and 18 are caused to press in opposite directions on the interposed rubber and indent and stretch it, so that a lump 20 (Fig. 5) of rubber inserted in the hopper 14 is caused to assume approximately the form shown by Fig. 6, the rubber being stretched into a thin sinuous sheet, which becomes thinner as it passes downwardly.

Means are provided for discharging a jet or jets of water or other liquid between the supports 12 and 13, the water impinging on the stretched surfaces of the rubber and removing therefrom sand and other foreign matter, which is loosened and exposed by the stretching operation. One or more nozzles 21 may be provided for this purpose.

The support 13 may be oscillated to vary the distance between the supports, by any suitable mechanism, which may include a crank shaft 22, the crank 23 of which is connected by a link 24 with the support 13.

The lower portions of the supports 12 and 13 may be provided respectively with corrugated jaws 25, 26, which are opened and closed by the described movements of the support 13 and act to crush the rubber after it has passed below the stretching jaws.

The rigid connection of the stretching jaws at their opposite ends to the supports is important, the jaws being enabled thereby to withstand the strain exerted on them by the tensile strength of the rubber.

I claim:

1. A machine for cleaning crude rubber, comprising two series of alternating jaws, two opposed supports therefor, the jaws being rigidly attached at both ends to the supports and spaced therefrom, one of the supports being pivoted to oscillate toward and from the other, and means for oscillating the pivoted support to cause the jaws to engage and stretch elastic matter interposed between them.

2. A machine for cleaning crude rubber, comprising two series of alternating jaws, two opposed supports therefor, the jaws being rigidly attached at both ends to the supports and spaced therefrom, and means for varying the distance between the supports to cause the jaws to engage and stretch elastic matter interposed between them, the supports being provided at their lower portions with corrugated pressing jaws which are alternately opened and closed.

In testimony whereof I have affixed my signature, in presence of two witnesses.

WILLIAM R. SMITH.

Witnesses:
C. F. BROWN,
P. W. PEZZETTI.